US010626956B2

(12) United States Patent
Kim et al.

(10) Patent No.: US 10,626,956 B2

(45) Date of Patent: Apr. 21, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jin Ho Kim, Suwon-si (KR); Jae Joon Lee, Anyang-si (KR); Jong Sool Park, Seongnam-si (KR); Kyeong Hun Lee, Seoul (KR); Jong Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/183,595

(22) Filed: Nov. 7, 2018

(65) Prior Publication Data

US 2020/0003283 A1 Jan. 2, 2020

(30) Foreign Application Priority Data

Jul. 2, 2018 (KR) ........................ 10-2018-0076652

(51) Int. Cl.
*F16H 3/66* (2006.01)

(52) U.S. Cl.
CPC ....... *F16H 3/66* (2013.01); *F16H 2200/0069* (2013.01); *F16H 2200/2015* (2013.01); *F16H 2200/2046* (2013.01)

(58) Field of Classification Search
CPC ............... F16H 3/66; F16H 2200/2015; F16H 2200/0069; F16H 2200/2046
See application file for complete search history.

(56) References Cited

U.S. PATENT DOCUMENTS 9,506,533 B2 * 11/2016 Park ........................ F16H 3/666
9,518,639 B2 * 12/2016 Lee ......................... F16H 3/666
9,625,011 B2 * 4/2017 Lee ......................... F16H 3/666

FOREIGN PATENT DOCUMENTS

KR 10-2017-0108440 A 9/2017

* cited by examiner

*Primary Examiner* — Tinh Dang
(74) *Attorney, Agent, or Firm* — Morgan, Lewis & Bockius LLP

(57) ABSTRACT

A planetary gear train may include an input shaft receiving power; an output shaft outputting power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a fifth planetary gear set having thirteenth, fourteenth, and fifteenth rotation elements; and first to ninth shafts connecting the rotation elements of the first planetary gear set to the fifth planetary gear set.

12 Claims, 3 Drawing Sheets

HS
B1
B2
B3
SH8
SH9
SH4
SH3
SH6
PG5
R1
R4
CL3
R2
R3
R5
SH5
SH2
C1
C4
C2
C3
C5
SH7
CL2
S1
S4
S2
S3
S5
PG1
PG3
CL1
IN
OUT
SH1
PG4
PG2

FIG. 2

| SHIFT STAGE | COUPLING ELEMENT | | | | | | GEAR RATIO | STEP RATIO |
|---|---|---|---|---|---|---|---|---|
| | CL1 | CL2 | CL3 | B1 | B2 | B3 | | |
| 1ST | O | | | O | | O | 5.863 | – |
| 2ND | | O | | O | | O | 3.646 | 1.608 |
| 3RD | | O | | | O | O | 2.616 | 1.394 |
| 4TH | O | O | | | | O | 1.801 | 1.453 |
| 5TH | | O | O | | | O | 1.442 | 1.249 |
| 6TH | O | | O | | | O | 1.195 | 1.207 |
| 7TH | O | O | O | | | | 1.000 | 1.195 |
| 8TH | O | | O | | O | | 0.879 | 1.138 |
| 9TH | | O | O | | O | | 0.724 | 1.214 |
| 10TH | | O | O | O | | | 0.617 | 1.173 |
| REV | | | O | O | | O | −5.000 | – |

PLANETARY GEAR TRAIN OF AUTOMATIC TRANSMISSION FOR VEHICLE

CROSS REFERENCE TO RELATED APPLICATION

The present application claims priority to Korean Patent Application No. 10-2018-0076652, filed Jul. 2, 2018, the entire contents of which is incorporated herein for all purposes by this reference.

BACKGROUND OF THE INVENTION

Field of the Invention

The present invention relates to a planetary gear train of an automatic transmission for a vehicle.

Description of Related Art

The multi-stage transmission enhances fuel efficiency of a vehicle by facilitating an engine to operate in a more efficient region over the entire travel region of the vehicle, and is intended to improve the drivability of the vehicle by providing a gear ratio which is more suitable for the driver's request.

Thus, to achieve an effect of the multi-stage transmission properly, a gear ratio span, which is the total gear ratio range which may be provided by the transmission, may be increased, a step ratio, which is the difference between a gear stage and an adjacent gear stage, may be properly ensured, and the step ratio may be changed as linearly as possible.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a planetary gear train of an automatic transmission for a vehicle, in which ten forward and one reverse speeds are provided, and a wide gear ratio span, a step ratio above a predetermined level, and linearity of the step ratio are ensured while the torque to be handled by components is low, whereby it is possible to ensure sufficient durability.

In various aspects of the present invention, according to some aspect of the present invention, there is provided a planetary gear train of an automatic transmission for a vehicle, the planetary gear train including: an input shaft receiving power;

an output shaft outputting power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a fifth planetary gear set having thirteenth, fourteenth, and fifteenth rotation elements; a first shaft connected to the first rotation element and the input shaft; a second shaft connected to the fourteenth rotation element and the output shaft; a third shaft connected to the fifth rotation element, the ninth rotation element, and the thirteenth rotation element; a fourth shaft connected to the sixth rotation element; a fifth shaft connected to the eighth rotation element; a sixth shaft connected to the eleventh rotation element and the fifteenth rotation element; a seventh shaft connected to the second rotation element, the fourth rotation element, and the seventh rotation element; an eighth shaft connected to the third rotation element and the tenth rotation element; and a ninth shaft connected to the twelfth rotation element.

The planetary gear train may further include six coupling elements selectively connecting shafts of the first to the ninth shafts or selectively connecting a shaft and a transmission housing, wherein, of the six coupling elements, three coupling elements are controlled to be simultaneously engaged with each other, such that a forward speed or a reverse speed is implemented.

The six coupling elements may include: three clutches connecting two shafts of the first to the ninth shafts together; and three brakes selectively connecting shafts of the first to the ninth shafts without being connected to the input shaft or the output shaft, with the transmission housing.

The six coupling elements may include: a first clutch provided between the first shaft and the third shaft; a second clutch provided between the first shaft and the fifth shaft; a third clutch provided between the fourth shaft and the sixth shaft; a first brake provided between the seventh shaft and the transmission housing; a second brake provided between the eighth shaft and the transmission housing; and a third brake provided between the ninth shaft and the transmission housing.

The six coupling elements may include: a first clutch provided between the first shaft and the third shaft; a second clutch provided between the first shaft and the fifth shaft; a third clutch provided between the second shaft and the fourth shaft; a first brake provided between the seventh shaft and the transmission housing; a second brake provided between the eighth shaft and the transmission housing; and a third brake provided between the ninth shaft and the transmission housing.

The first, the second, and the third rotation elements may include a first sun gear, a first planet carrier, and a first ring gear; the fourth, the fifth, and the sixth rotation elements may include a second sun gear, a second planet carrier, and a second ring gear; the seventh, the eighth, and the ninth rotation elements may include a third sun gear, a third planet carrier, and a third ring gear; the tenth, the eleventh, and the twelfth rotation elements may include a fourth sun gear, a fourth planet carrier, and a fourth ring gear; and the thirteenth, the fourteenth, and the fifteenth rotation element may include a fifth sun gear, a fifth planet carrier, and a fifth ring gear.

The first, second, third, fourth, and fifth planetary gear sets may be disposed such that the first planetary gear set, the fourth planetary gear set, the second planetary gear set, the third planetary gear set, and the fifth planetary gear set are sequentially disposed from respective first sides toward second sides.

In various aspects of the present invention, according to some aspect of the present invention, there is further provided a planetary gear train of an automatic transmission for a vehicle, the planetary gear train including: a first planetary gear set, a second planetary gear set, a third planetary gear set, a fourth planetary gear set, and a fifth planetary gear set provided with respective three rotation elements; six coupling elements configured to variably provide a frictional force; and nine shafts connected to the rotation elements of the planetary gear sets, wherein, of the nine shafts, a first shaft is directly connected to a first rotation element of the first planetary gear set and an input shaft; a second shaft is directly connected to a second rotation element of the fifth planetary gear set and an output shaft; a third shaft is directly connected to a second rotation element of the second planetary gear set, a third rotation element of the third planetary gear set, and a first rotation element of the fifth planetary gear set; a fourth shaft is directly connected to a third rotation element of the second planetary gear set; a fifth shaft is directly connected to a second rotation element of the third planetary gear set; a sixth shaft is directly connected to a second rotation element of the fourth planetary gear set and a third rotation element of the fifth planetary gear set; and remaining three shafts are fixedly provided in a transmission housing.

The three shafts fixedly provided in the transmission housing may include a seventh shaft, an eighth shaft, and a ninth shaft, wherein the seventh shaft is directly connected to a second rotation element of the first planetary gear set, and a first rotation element of the second planetary gear set, and a first rotation element of the third planetary gear set; the eighth shaft is directly connected to a third rotation element of the first planetary gear set and a first rotation element of the fourth planetary gear set; and the ninth shaft is directly connected to a third rotation element of the fourth planetary gear set.

Of the six coupling elements, a first clutch may be provided between the first shaft and the third shaft; a second clutch may be provided between the first shaft and the fifth shaft; a third clutch may be provided between the fourth shaft and the sixth shaft; a first brake may be provided between the seventh shaft and the transmission housing; a second brake may be provided between the eighth shaft and the transmission housing; and a third brake may be provided between the ninth shaft and the transmission housing.

Of the six coupling elements, a first clutch may be provided between the first shaft and the third shaft; a second clutch may be provided between the first shaft and the fifth shaft; a third clutch may be provided between the second shaft and the fourth shaft; a first brake may be provided between the seventh shaft and the transmission housing; a second brake may be provided between the eighth shaft and the transmission housing; and a third brake may be provided between the ninth shaft and the transmission housing.

The first, second, third, fourth, and fifth planetary gear sets may be disposed such that the first planetary gear set, the fourth planetary gear set, the second planetary gear set, the third planetary gear set, and the fifth planetary gear set are sequentially disposed along an axial direction of the input shaft and the output shaft.

The rotation elements of each of the first planetary gear set to the fifth planetary gear set may be disposed such that the first rotation element, the second rotation element, and the third rotation element are sequentially disposed radially outwardly from a rotation center.

According to the planetary gear train of an automatic transmission for a vehicle configured as described above, it is advantageous in that ten forward and one reverse speeds are provided, and the gear ratio span reaches 9.5, so that the engine may be driven mainly in a more efficient region, whereby the fuel efficiency of the vehicle may be improved.

The present invention is further advantageous in that a minimum step ratio is 1.138 or more, and the change in the step ratio according to changing gear is linear, whereby the driving performance of the vehicle may be maximized by improving the vehicle acceleration before and after the shift, and the rhythm of the engine speed.

The present invention is further advantageous in that a wide gear ratio span, a step ratio above a predetermined level, and linearity of the step ratio are ensured while the torque to be handled by components is low, whereby it is possible to ensure sufficient durability.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation mode table of the planetary gear train of FIG. 1;

Figure 1:
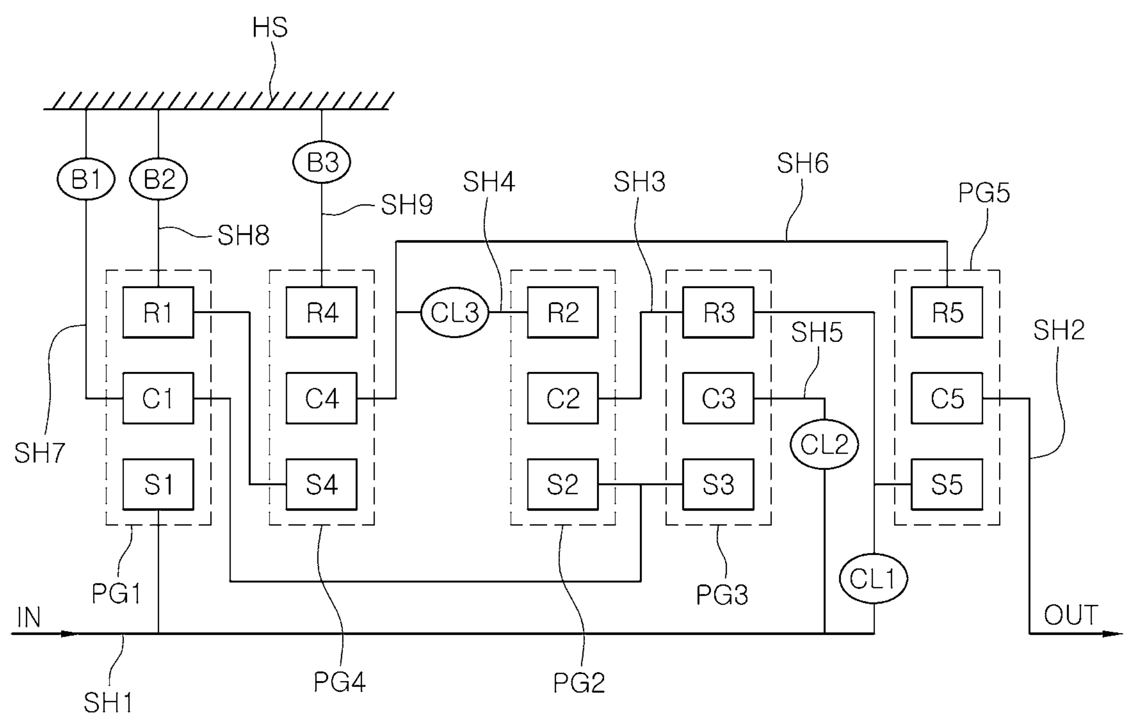
FIG. 1 is a view showing a planetary gear train of an automatic transmission for a vehicle according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinbelow, a multi-stage transmission for a vehicle according to an exemplary embodiment of the present invention will be described in detail with reference to the accompanying drawings.

Referring to FIG. 1, a planetary gear train of an automatic transmission for a vehicle of the present invention includes: an input shaft IN receiving power from a power source such as an engine; an output shaft OUT outputting power; a first planetary gear set PG1 having first, second, third rotation elements; a second planetary gear set PG2 having fourth, fifth, sixth rotation elements; a third planetary gear set PG3 having seventh, eighth, ninth rotation elements; a fourth planetary gear set PG4 having tenth, eleventh, twelfth rotation elements; and a fifth planetary gear set PG5 having thirteenth, fourteenth, fifteenth rotation elements.

The planetary gear train includes: a first shaft SH1 connected to both the first rotation element and the input shaft IN; a second shaft SH2 connected to both the fourteenth rotation element and the output shaft OUT; a third shaft SH3 connected to the fifth rotation element, the ninth rotation element, and the thirteenth rotation element; a fourth shaft SH4 connected to the sixth rotation element; a fifth shaft SH5 connected to the eighth rotation element; a sixth shaft SH6 connected to the eleventh rotation element and the fifteenth rotation element; a seventh shaft SH7 connected to the second rotation element, the fourth rotation element, and the seventh rotation element; an eighth shaft SH8 connected to the third rotation element and the tenth rotation element; and a ninth shaft SH9 connected to the twelfth rotation element.

The first, second, third, fourth, fifth planetary gear sets are disposed such that the first planetary gear set PG1, the fourth planetary gear set PG4, the second planetary gear set PG2, the third planetary gear set PG3, and the fifth planetary gear set PG5 are sequentially disposed from respective first sides toward second sides.

In other words, a power source such as an engine may supply power through the input shaft IN and first shaft SH1, and after the supplied power is appropriately shifted through the configuration of the present invention, in which the first planetary gear set PG1, the fourth planetary gear set PG4, the second planetary gear set PG2, the third planetary gear set PG3, and the fifth planetary gear set PG5 are sequentially disposed, then the power is output to the output shaft OUT via the fourteenth rotation element of the fifth planetary gear set PG5 and the second shaft SH2.

Each of the first planetary gear set PG1, the fourth planetary gear set PG4, the second planetary gear set PG2, the third planetary gear set PG3, and the fifth planetary gear set PG5 forming the planetary gear train is a single pinion planetary gear set having three rotation elements.

The planetary gear train is mounted in a transmission housing HS, wherein a torque converter may be provided between the power source such as an engine and the input shaft IN and the power output to the output shaft OUT may be supplied to the drive wheel of the vehicle through a differential which is not shown.

The planetary gear train further includes six coupling elements selectively connecting shafts of the first shaft SH1 to the ninth shaft SH9 or selectively connecting a shaft and the transmission housing, wherein of the six coupling elements, three coupling elements are controlled to be simultaneously engaged with each other, such that a forward speed or a reverse speed is implemented.

In other words, in implementing one of first to tenth forward gear stages and R-gear as a reverse speed as shown in FIG. 2, three predetermined coupling elements of the six coupling elements are engaged with each other such that the corresponding gear stage is implemented.

Of course, when shifting from one stage to a neighboring stage of the gear stages, a clutch-to-clutch shifting, in which shifting is performed by engaging one coupling element in the target gear stage while releasing another coupling element in the present gear stage of the respective three coupling elements required for implementing each gear stage, is possible.

The six coupling elements include three clutches connecting two shafts of the first shaft SH1 to the ninth shaft SH9 together, and three brakes selectively connecting shafts of the first shaft SH1 to the ninth shaft SH9 without being connected to the input shaft IN or the output shaft OUT, with the transmission housing.

In the various exemplary embodiments of FIG. 1, the six coupling elements include: a first clutch CL1 provided between the first shaft SH1 and the third shaft SH3; a second clutch CL2 provided between the first shaft SH1 and the fifth shaft SH5; a third clutch CL3 provided between the fourth shaft SH4 and the sixth shaft SH6; a first brake B1 provided between the seventh shaft SH7 and the transmission housing; a second brake B2 provided between the eighth shaft SH8 and the transmission housing; and a third brake B3 provided between the ninth shaft SH9 and the transmission housing.

Figure 3:
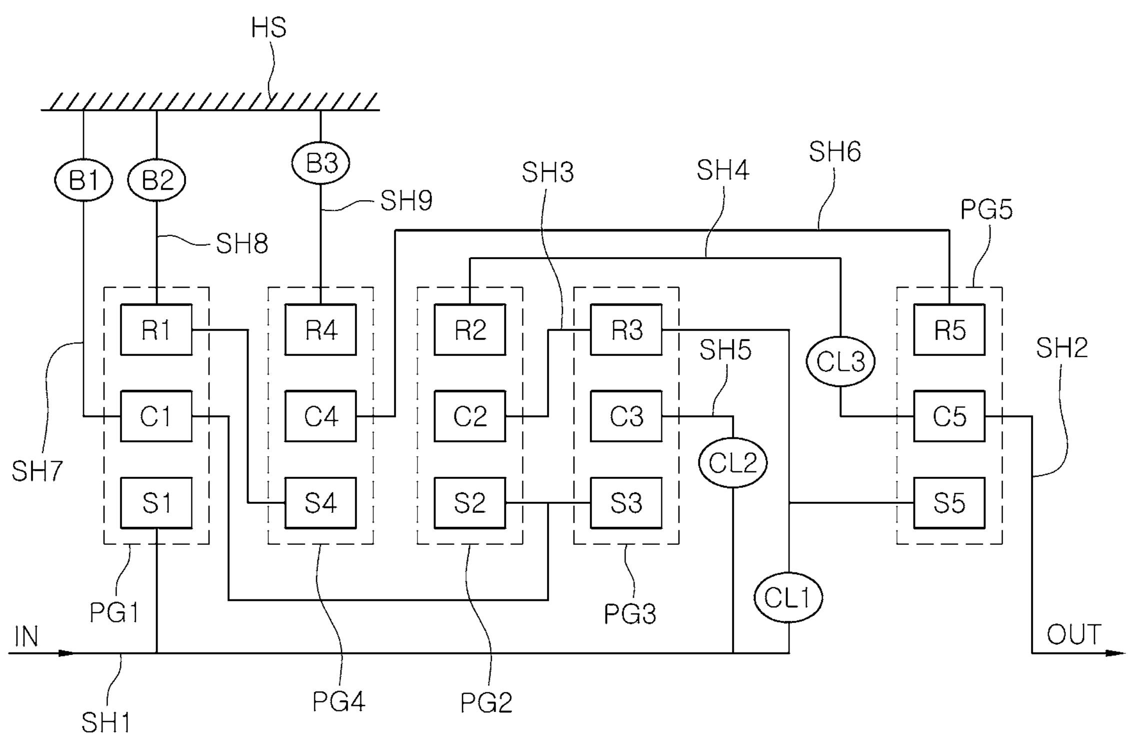
FIG. 3 is a view showing a planetary gear train of an automatic transmission for a vehicle according to various exemplary embodiments of the present invention.

In the various exemplary embodiments of FIG. 3, the other configuration is the same as that of the various exemplary embodiments of the present invention, and only the arrangement of the third clutch CL3 among the six coupling elements is different, wherein in the various exemplary embodiments of the present invention, the six coupling elements include: the first clutch CL1 provided between the first shaft SH1 and the third shaft SH3; the second clutch CL2 provided between the first shaft SH1 and the fifth shaft SH5; the third clutch CL3 provided between and the second shaft SH2 and the fourth shaft SH4; the first brake B1 provided between the seventh shaft SH7 and the transmission housing; the second brake B2 provided between the eighth shaft SH8 and the transmission housing; and the third brake B3 provided between the ninth shaft SH9 and the transmission housing.

In both the various exemplary embodiments of the present invention, the first, the second, and the third rotation elements include a first sun gear S1, a first planet carrier C1, and a first ring gear R1; the fourth, the fifth, and the sixth rotation elements include a second sun gear S2, a second planet carrier C2, and a second ring gear R2; the seventh, the eighth, and the ninth rotation elements include a third sun gear S3, a third planet carrier C3, and a third ring gear R3; the tenth, the eleventh, and the twelfth rotation elements include a fourth sun gear S4, a fourth planet carrier C4, and a fourth ring gear R4; and the thirteenth, the fourteenth, and the fifteenth rotation element include a fifth sun gear S5, a fifth planet carrier C5, and a fifth ring gear R5.

The planetary gear train of an automatic transmission for a vehicle configured as described above implements gear stages according to the operation mode table of FIG. 2.

A first forward speed is implemented by engaging the first clutch CL1, the first brake B1, and the third brake B3 with each other.

The power input to the input shaft IN and the first shaft SH1 is transmitted to the fifth sun gear S5 through the first clutch CL1; since the first planet carrier C1 is locked by the first brake B1, the power of the first sun gear S1 directly connected to the first shaft SH1 is transmitted reversely to the first ring gear R1 and transmitted to the fourth sun gear S4 through the eighth shaft SH8; and since the fourth ring gear R4 is locked by the third brake B3, the power of the fourth sun gear S4 is decelerated at the fourth planet carrier C4 and transmitted to the fifth ring gear R5 through the sixth shaft SH6.

Accordingly, the power transmitted to the fifth ring gear R5 is decelerated by a reaction force provided when the fifth ring gear R5 is reversely rotated, and forms an output of a first gear ratio through the fifth planet carrier C5, providing the same to the second shaft SH2 and the output shaft OUT.

A second forward speed is implemented by releasing the first clutch CL1 and engaging the second clutch CL2.

The power input to the input shaft IN and the first shaft SH1 is transmitted to the third planet carrier C3 through the second clutch CL2, and since the third sun gear S3 is locked as the first brake B1 locks the seventh shaft SH7, the power supplied to the third planet carrier C3 is accelerated by the third ring gear R3 and transmitted to the fifth sun gear S5 through the third shaft SH3.

Furthermore, the power of the first sun gear S1 is transmitted reversely to the first ring gear R1 and transmitted to the fourth sun gear S4 through the eighth shaft SH8, then is decelerated by the fourth planet carrier C4 since the fourth ring gear R4 is locked by the third brake B3, and is transmitted to the fifth ring gear R5 through the sixth shaft SH6.

Accordingly, the fifth planet carrier C5 forms an output of a second forward speed faster than the first forward speed and provides the same to the second shaft SH2 and the output shaft OUT.

A third forward speed is implemented by releasing the first brake B1 and engaging the second brake B2.

The power of the first shaft SH1 is transmitted to the third planet carrier C3 through the second clutch CL2, and since the first ring gear R1 is locked by the second brake B2, the first planet carrier C1 transmits the decelerated power to the second sun gear S2 and the third sun gear S3 through the seventh shaft SH7.

Meanwhile, as the third brake B3 locks the fourth ring gear R4, and the second brake B2 locks the fourth sun gear S4 such that the fourth planet carrier C4 is locked together, the fifth ring gear R5 is locked through the sixth shaft SH6.

Accordingly, the power transmitted to the third planet carrier C3 and the power transmitted to the third sun gear S3 are shifted by a gear ratio of the third planetary gear set PG3 and are supplied to the fifth sun gear S5 through the third ring gear R3, and with fifth ring gear R5 locked, the power supplied to the fifth sun gear S5 is decelerated and is output to the fifth planet carrier C5 while forming the third gear ratio.

A fourth forward speed is implemented by releasing the second brake B2 and engaging the first clutch CL1.

Since the first clutch CL1 and the second clutch CL2 are engaged with each other, the third planet carrier C3 and the third ring gear R3 are constrained to each other, whereby all the rotation elements of the third planetary gear set PG3 are integrated, and thus, all the rotation elements of the second planetary gear set PG2 and the first planetary gear set PG1 are integrated, and the fourth sun gear S4 rotates through the eighth shaft SH8 at the same speed as the first shaft SH1.

The power of the fourth sun gear S4 is decelerated by the fourth planet carrier C4 and is supplied to the fifth ring gear R5 through the sixth shaft SH6 since the fourth ring gear R4 is locked by the third brake B3, and the power of the first shaft SH1 is supplied to the fifth sun gear S5 through the first clutch CL1, the fifth planetary gear set PG5 receives power in parallel from the two rotation elements and transmits an output of the fourth gear ratio to the second shaft SH2 and the output shaft OUT through the fifth planet carrier C5.

As described above, by implementing a torque parallel scheme that allows the torque to be input in parallel to two rotation elements of a planetary gear set, it is possible to improve the durability and efficiency of the components forming the planetary gear train by reducing the torque to be handled by the rotation elements of the planetary gear set.

A fifth forward speed is implemented by releasing the first clutch CL1 and engaging the third clutch CL3.

In the state where the fourth ring gear R4 is locked by the third brake B3, and the sixth shaft SH6 and the fourth shaft SH4 are connected by the third clutch CL3, the power transmitted from the first shaft SH1 to the third planet carrier C3 through the second clutch CL2 forms an output of the fifth gear ratio through the fifth planet carrier C5 of the fifth planetary gear set PG5 and outputs the same to the output shaft OUT.

A sixth forward speed is implemented by releasing the second clutch CL2 and engaging the first clutch CL1.

In the state where the fourth ring gear R4 is locked by the third brake B3, and the sixth shaft SH6 and the fourth shaft SH4 are connected by the third clutch CL3, the power transmitted from the first shaft SH1 to the fifth sun gear S5 through the first clutch CL1 forms an output of the sixth gear ratio through the fifth planet carrier C5 and outputs the same to the second shaft SH2 and the output shaft OUT.

A seventh forward speed is implemented by releasing the third brake B3 and engaging the second clutch CL2.

As the first clutch CL1, the second clutch CL2, and the third clutch CL3 are engaged with each other, all the rotation elements of the second planetary gear set PG2, the third planetary gear set PG3, and the fifth planetary gear set PG5 are integrally rotated, whereby an output of 1:1 gear ratio, the seventh gear stage, is output to the second shaft SH2 and output shaft OUT.

An eighth forward speed is implemented by releasing the second clutch CL2 and engaging the second brake B2.

In the state where the eighth shaft SH8 is locked by the second brake B2, and the sixth shaft SH6 and the fourth shaft SH4 are connected by the third clutch CL3, the power of the first shaft SH1 is transmitted to the third shaft SH3 through the first clutch CL1, is transmitted to the second planet carrier C2 and the fifth sun gear S5, and forms an output of the eighth gear ratio through the fifth planet carrier C5, and outputs the same to the second shaft SH2 and the output shaft OUT.

A ninth forward speed is implemented by releasing the first clutch CL1 and engaging the second clutch CL2.

In the state where the eighth shaft SH8 is locked by the second brake B2 and the sixth shaft SH6 and the fourth shaft SH4 are connected by the third clutch CL3, the power of the first shaft SH1 is transmitted to the third planet carrier C3 through the second clutch CL2, whereby an output of ninth gear ratio is formed through the fifth planet carrier C5 of the fifth planetary gear set PG5, and is output to the output shaft OUT.

A tenth forward speed is implemented by releasing the second brake B2 and engaging the first brake B1.

In the state where the seventh shaft SH7 is locked by the first brake B1, and the sixth shaft SH6 and the fourth shaft SH4 are connected by the third clutch CL3, the power of the input shaft IN and the first shaft SH1 is transmitted to the fifth shaft SH5 and the third planet carrier C3 through the second clutch CL2, whereby an output of tenth gear ratio is formed at the fifth planet carrier C5 of the fifth planetary gear set PG5, and is output to the second shaft SH2 and the output shaft OUT.

An R-gear, which is a reverse speed, is implemented by engaging the third clutch CL3, the first brake B1, and the third brake B3.

In the state where the seventh shaft SH7 is locked by the first brake B1, the ninth shaft SH9 is locked by the third brake B3, and the sixth shaft SH6 and the fourth shaft SH4 are connected by the third clutch CL3, the power supplied to the first sun gear S1 through the input shaft IN and the first shaft SH1 is transmitted reversely to the first ring gear R1, then is decelerated, and is output to the output shaft OUT while forming through the fifth planet carrier C5.

Meanwhile, the present invention described above may be expressed as follows.

In other words, the present invention may include: the first planetary gear set PG1, the second planetary gear set PG2, the third planetary gear set PG3, the fourth planetary gear set PG4, and the fifth planetary gear set PG5 provided with respective three rotation elements; six coupling elements configured to variably provide a frictional force; and nine shafts connected to the rotation elements of the planetary gear sets.

Herein, the first shaft SH1 is directly connected to the first rotation element of the first planetary gear set and the input shaft IN; the second shaft SH2 is directly connected to both the second rotation element of the fifth planetary gear set and the output shaft OUT; the third shaft SH3 is directly connected to the second rotation element of the second planetary gear set, the third rotation element of the third planetary gear set, and the first rotation element of the fifth planetary gear set; the fourth shaft SH4 is directly connected to the third rotation element of the second planetary gear set; the fifth shaft SH5 is directly connected to the second rotation element of the third planetary gear set; the sixth shaft SH6 is directly connected to the second rotation element of the fourth planetary gear set and the third rotation element of the fifth planetary gear set; and remaining three shafts are fixedly provided in the transmission housing.

The three shafts fixedly provided in the transmission housing include the seventh shaft, the eighth shaft, and the ninth shaft, wherein the seventh shaft SH7 is directly connected to the second rotation element of the first planetary gear set, and the first rotation element of the second planetary gear set, and the first rotation element of the third planetary gear set; the eighth shaft SH8 is directly connected to the third rotation element of the first planetary gear set and the first rotation element of the fourth planetary gear set; and the ninth shaft SH9 is directly connected to the third rotation element of the fourth planetary gear set.

In the case of the exemplary embodiment of FIG. 1, of the six coupling elements, the first clutch CL1 is provided between the first shaft and the third shaft; the second clutch CL2 is provided between the first shaft and the fifth shaft; the third clutch CL3 is provided between the fourth shaft and the sixth shaft; the first brake B1 is provided between the seventh shaft and the transmission housing; the second brake B2 is provided between the eighth shaft and the transmission housing; and the third brake B3 is provided between the ninth shaft and the transmission housing.

Meanwhile, in the case of the exemplary embodiment of FIG. 2, of the six coupling elements, the first clutch CL1 is provided between the first shaft and the third shaft; the second clutch CL2 is provided between the first shaft and the fifth shaft; the third clutch CL3 is provided between the second shaft and the fourth shaft; the first brake B1 is provided between the seventh shaft and the transmission housing; the second brake B2 is provided between the eighth shaft and the transmission housing; and the third brake B3 is provided between the ninth shaft and the transmission housing HS.

Of course, the first, second, third, fourth, fifth planetary gear sets are disposed such that the first planetary gear set PG1, the fourth planetary gear set PG4, the second planetary gear set PG2, the third planetary gear set PG3, and the fifth planetary gear set PG5 are sequentially disposed along the axial direction of the input shaft and the output shaft.

Furthermore, the rotation elements of each of the first planetary gear set to the fifth planetary gear set are disposed such that the first rotation element, the second rotation element, and the third rotation element are sequentially disposed radially outwardly from a rotation center, wherein each first rotation element may be a sun gear, each second rotation element may be a carrier, and each third rotation element may be a ring gear.

As described above, according to the planetary gear train of an automatic transmission for a vehicle of the present invention, ten forward and one reverse gear stages are provided, and the gear ratio span reaches 9.5, so that the engine may be driven mainly in a more efficient region, whereby it is possible to improve the fuel efficiency of the vehicle.

Furthermore, according to an exemplary embodiment of the present invention, the minimum step ratio is 1.138 or more, and the linearity of the step ratio changes with the gear stage change is ensured to be similar to the tendency of the ideal step ratio change, whereby the driving performance of the vehicle may be maximized by improving the vehicle acceleration before and after the shift, and the rhythm of the engine speed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the planetary gear train apparatus comprising:

an input shaft receiving power;

an output shaft outputting power;

a first planetary gear set having a first rotation element, a second rotation element, and a third rotation element;

a second planetary gear set having a fourth rotation element, a fifth rotation element, and a sixth rotation element;

a third planetary gear set having a seventh rotation element, an eighth rotation element, and a ninth rotation element;

a fourth planetary gear set having a tenth rotation element, an eleventh rotation element, and a twelfth rotation element;

a fifth planetary gear set having a thirteenth rotation element, a fourteenth rotation element, and a fifteenth rotation element;

a first shaft fixedly connected to the first rotation element and the input shaft;

a second shaft fixedly connected to the fourteenth rotation element and the output shaft;

a third shaft fixedly connected to the fifth rotation element, the ninth rotation element, and the thirteenth rotation element;

a fourth shaft fixedly connected to the sixth rotation element;

a fifth shaft fixedly connected to the eighth rotation element;

a sixth shaft fixedly connected to the eleventh rotation element and the fifteenth rotation element;

a seventh shaft fixedly connected to the second rotation element, the fourth rotation element, and the seventh rotation element;

an eighth shaft fixedly connected to the third rotation element and the tenth rotation element; and a ninth shaft fixedly connected to the twelfth rotation element.

2. The planetary gear train apparatus of claim 1, further including six coupling elements selectively connecting shafts among the first to the ninth shafts or selectively connecting a shaft among the first to the ninth shafts and a transmission housing, wherein, three coupling elements among the six coupling elements, are controlled to be engaged such that a forward speed or a reverse speed is implemented.

3. The planetary gear train apparatus of claim 2, wherein the six coupling elements include:

three clutches connecting two shafts of the first to the ninth shafts together; and three brakes selectively connecting shafts of the first to the ninth shafts without being connected to the input shaft or the output shaft, with the transmission housing.

4. The planetary gear train apparatus of claim 2, wherein the six coupling elements include:

a first clutch mounted between the first shaft and the third shaft;

a second clutch mounted between the first shaft and the fifth shaft;

a third clutch mounted between the fourth shaft and the sixth shaft;

a first brake mounted between the seventh shaft and the transmission housing;

a second brake mounted between the eighth shaft and the transmission housing; and a third brake mounted between the ninth shaft and the transmission housing.

5. The planetary gear train apparatus of claim 2, wherein the six coupling elements include:

a first clutch mounted between the first shaft and the third shaft;

a second clutch mounted between the first shaft and the fifth shaft;

a third clutch mounted between the second shaft and the fourth shaft;

a first brake mounted between the seventh shaft and the transmission housing;

a second brake mounted between the eighth shaft and the transmission housing; and a third brake mounted between the ninth shaft and the transmission housing.

6. The planetary gear train apparatus of claim 1, wherein the first, the second, and the third rotation elements include a first sun gear, a first planet carrier, and a first ring gear;

the fourth, the fifth, and the sixth rotation elements include a second sun gear, a second planet carrier, and a second ring gear;

the seventh, the eighth, and the ninth rotation elements include a third sun gear, a third planet cattier, and a third ring gear;

the tenth, the eleventh, and the twelfth rotation elements include a fourth sun gear, a fourth planet carrier, and a fourth ring gear; and the thirteenth, the fourteenth, and the fifteenth rotation element include a fifth sun gear, a fifth planet carrier, and a fifth ring gear.

7. The planetary gear train apparatus of claim 1, wherein the first, second, third, fourth, and fifth planetary gear sets are disposed such that the first planetary gear set, the fourth planetary gear set, the second planetary gear set, the third planetary gear set, and the fifth planetary gear set are sequentially disposed from respective first sides toward second sides with respect to an engine side.

8. A planetary gear train apparatus of an automatic transmission for a vehicle, the planetary gear train apparatus comprising:

a first planetary gear set, a second planetary gear set, a third planetary gear set, a fourth planetary gear set, and a fifth planetary gear set respectively provided with three rotation elements having first, second, and third rotation elements;

six coupling elements configured to variably provide a frictional force; and a first shaft fixedly connected to the first rotation element of the first planetary gear set and an input shaft;

a second shaft fixedly connected to the second rotation element of the fifth planetary gear set and an output shaft;

a third shaft fixedly connected to the second rotation element of the second planetary gear set, the third rotation element of the third planetary gear set, and the first rotation element of the fifth planetary gear set;

a fourth shaft fixedly connected to the third rotation element of the second planetary gear set;

a fifth shaft fixedly connected to the second rotation element of the third planetary gear set;

a sixth shaft fixedly connected to the second rotation element of the fourth planetary gear set and the third rotation element of the fifth planetary gear set; and seventh to ninth shafts fixedly provided in a transmission housing, wherein the seventh shaft is fixedly connected to the second rotation element of the first planetary gear set, and the first rotation element of the second planetary gear set, and the first rotation element of the third planetary set;

wherein the eighth shaft is fixedly connected to the third rotation element of the first planetary gear set and the first rotation element of the fourth planetary gear set; and wherein the ninth shaft is fixedly connected to the third rotation element of the fourth planetary gear set.

9. The planetary gear train apparatus of claim 8, wherein the six coupling elements include:

a first clutch mounted between the first shaft and the third shaft;

a second clutch mounted between the first shaft and the fifth shaft;

a third clutch mounted between the fourth shaft and the sixth shaft;

a first brake mounted between the seventh shaft and the transmission housing;

a second brake mounted between the eighth shaft and the transmission housing; and a third brake mounted between the ninth shaft and the transmission housing.

10. The planetary gear train apparatus of claim 8, wherein the six coupling elements includes:

a first clutch mounted between the first shaft and the third shaft;

a second clutch mounted between the first shaft and the fifth shaft;

a third clutch mounted between the second shaft and the fourth shaft;

a first brake mounted between the seventh shaft and the transmission housing;

a second brake mounted between the eighth shaft and the transmission housing; and a third brake mounted between the ninth shaft and the transmission housing.

11. The planetary gear train apparatus of claim 8, wherein the first, second, third, fourth, and fifth planetary gear sets are disposed such that the first planetary gear set, the fourth planetary gear set, the second planetary gear set, the third planetary gear set, and the fifth planetary gear set are sequentially disposed along an axial direction of the input shaft and the output shaft with respect to an engine side.

12. The planetary gear train apparatus of claim 8, wherein the first, second and third rotation elements of each of the first planetary gear set to the fifth planetary gear set are disposed such that the first rotation element, the second rotation element, and the third rotation element are sequentially disposed radially outwardly from a rotation center thereof.

* * * * *